(12) United States Patent
Shah et al.

(10) Patent No.: US 11,995,786 B2
(45) Date of Patent: May 28, 2024

(54) INTERACTIVE IMAGE EDITING

(71) Applicant: SIEMENS HEALTHINEERS AG, Forchheim (DE)

(72) Inventors: Rishabh Shah, Wentworthville (AU); Kaloian Petkov, Lawrenceville, NJ (US); Lev Gretskii, Maple Ridge (CA); Daphne Yu, Yardley, PA (US); Klaus Engel, Nuremberg (DE)

(73) Assignee: Siemens Healthineers AG, Forchheim (DE)

( * ) Notice: Subject to any disclaimer, the term of this patent is extended or adjusted under 35 U.S.C. 154(b) by 159 days.

(21) Appl. No.: 17/647,225

(22) Filed: Jan. 6, 2022

(65) Prior Publication Data
US 2022/0230408 A1    Jul. 21, 2022

(30) Foreign Application Priority Data
Jan. 20, 2021 (EP) .................................. 21152457

(51) Int. Cl.
*G06T 15/08* (2011.01)
*G06T 19/20* (2011.01)
*G06V 10/25* (2022.01)
*G06V 10/74* (2022.01)
*G06V 10/77* (2022.01)

(52) U.S. Cl.
CPC ............. *G06T 19/20* (2013.01); *G06T 15/08* (2013.01); *G06V 10/25* (2022.01); *G06V 10/761* (2022.01); *G06V 10/7715* (2022.01)

(58) Field of Classification Search
CPC . G06T 19/20; G06T 2200/24; G06T 2200/08; G06T 2207/10; G06T 15/06; G06T 15/08
See application file for complete search history.

(56) References Cited

U.S. PATENT DOCUMENTS

| 8,988,461 | B1 | 3/2015 | Schmid et al. |
| 9,224,236 | B2 | 12/2015 | Engel |
| 10,546,049 | B2 | 1/2020 | Grady et al. |
| 10,636,184 | B2 | 4/2020 | Kreeger et al. |
| 2013/0135306 | A1 | 5/2013 | Engel |
| 2013/0185028 | A1 | 7/2013 | Sullivan |
| 2018/0225768 | A1 | 8/2018 | Gerber |
| 2021/0132687 | A1* | 5/2021 | Luo ............ G06F 3/011 |

(Continued)

FOREIGN PATENT DOCUMENTS

WO    2020010448 A1    1/2020

OTHER PUBLICATIONS

Bürger, Kai, Jens Krüger, and Rüdiger Westermann. "Direct volume editing." IEEE Transactions on Visualization and Computer Graphics 14.6 (2008): 1388-1395.

(Continued)

*Primary Examiner* — Hau H Nguyen

(57) ABSTRACT

The present embodiment relates to a renderer and an interactive method for image editing of medical 3D anatomical data. The method includes receiving a dataset with volumetric image data, which have been acquired from an image acquisition modality, and providing a signed distance field data structure of the received dataset. Further, editing operations are received from a user interface for editing at least a part of the provided signed distance field data structure. A visualization of the editing operations is calculated and displayed on a display.

18 Claims, 5 Drawing Sheets

(56) References Cited

U.S. PATENT DOCUMENTS

2021/0233330 A1* 7/2021 Sutherland ............... G06F 3/011
2021/0279942 A1    9/2021 Petkov et al.
2021/0375044 A1* 12/2021 George ................. H04N 13/271

OTHER PUBLICATIONS

Daniel Jönsson, et al.; "A Survey of Volumetric Illumination Techniques for Interactive Volume Rendering" Computer Graphics forum, vol. 0(1981), pp. 1-25.

Frisken, Sarah F., and Ronald N. Perry. "Designing with distance fields." ACM SIGGRAPH 2006 Courses. 2006. 60-66.

Jones, Mark W., J. Andreas Baerentzen, and Milos Sramek. "3D distance fields: A survey of techniques and applications." IEEE Transactions on visualization and Computer Graphics 12.4 (2006): 581-599.

Kroes T, Post FH, Botha CP (2012) Exposure Render: An Interactive Photo-Realistic vol. Rendering Framework. PLoS ONE 7(7): e38586.

Krüger J., Westermann R.: Acceleration techniques for GPU-based volume rendering. In Proc. of IEEE Visualization 2003 (2003), pp. 287-292.

Efohn, A., Kniss, J., Hansen, C., & Whitaker, R. (2004). A Streaming Narrow-Band Algorithm: Interactive. IEEE Transactions on Visualization and Computer Graphics, 10(4), 422-433.

Nysjö, F., Olsson, P., Malmberg, F., Carlbom, I., & Nyström, I. (2017). Using Anti-Aliased Signed Distance Fields for Generating. Journal of WSCG, 25(1), 11-20.

Nysjö, J., Malmberg, F., Sintorn, I.-M., & Nyström, I. (2015). BoneSplit—A 3D Texture Painting Tool for Interactive Bone. Journal of WSCG, 23, 157-166.

Perry, Ronald N., and Sarah F. Frisken. "Kizamu: A system for sculpting digital characters." In Proceedings of the 28th annual conference on Computer graphics and interactive techniques, pp. 47-56. 2001.

Sigg, Christian, Hadwiger, Markus, Fast third-order texture filtering. GPU Gems 2. p. 313-329. 2005.

Extended European Search Report (EESR) mailed Jul. 12, 2021 in corresponding European Patent Application No. 21152457.4.

\* cited by examiner

INTERACTIVE IMAGE EDITING

RELATED APPLICATION

This application claims the benefit of 21152457.4, filed Jan. 20, 2021, which is hereby incorporated by reference in its entirety.

FIELD

The present embodiments relate to medical volume editing, in particular to interactive editing of anatomical data, and rendering techniques for editing and visualization of editing operations.

BACKGROUND

Interactive volume rendering as a subdomain of visualization has become mature in the last decade. Several approaches exist that allow a domain expert to visualize and explore volumetric datasets at interactive frame rates on standard graphics hardware.

In particular, in the medical domain, quality is of key importance, because diagnosis and/or therapeutic measures may be based on the image data.

For example, vascular diseases are among the principal causes of death worldwide. This has motivated the development of a wide range of medical imaging technologies, dedicated to the visualization of vascular structures and the inner flowing blood, e.g., Magnetic Resonance Imaging (MRI) and X-ray Computed Tomography (CT). Further, for example, induced angiographic images provide information of precious help for clinical applications, such as diagnosis and surgery planning. However, these images are complex to analyze, due to the sparseness of blood vessels, their complex topological and geometric properties, the low signal-to-noise ratio, and the presence of noise and artifacts inherent to the flowing blood signal. In this challenging context, computer-aided tools dedicated to image interaction (making annotations and markings in the volume) and processing and analysis are indeed mandatory to help the clinicians in their daily practice.

In general, many existing volumes editing or segmentation systems modify a binary voxel map or a label map directly, resulting in interpolation artifacts at the segmentation boundary. In many cases, the painted regions are only used as seeds for automated segmentation algorithms, and the quality of the actual paint and its rendering is not a primary concern. Some prior art systems may have the limitation that quality of the rendered image volume is subject to improvement.

Existing systems may derive a smoothed mask or an anti-aliased signed distance field (in the following in short: SDF) from a binary segmentation, which may reduce the rendering artifacts. Typically, such algorithms are not suitable for use during interactive editing or segmentation.

SUMMARY

It is therefore an object to improve the prior art systems, in particular to improve quality of the interactive editing and visualization.

This object is solved by a method for interactive editing, by a renderer or a rendering system, respectively, by a computer program product, and by a computer-readable medium. Advantageous aspects, features and embodiments are described in the claims and in the following description together with advantages.

In the following, the solution is described with respect to the claimed method. Features, advantages or alternative embodiments herein can be assigned to the other claimed subject matters as well (e.g., to the renderer or the computer program product) and vice versa. In other words, claims for the renderer can be improved with features described or claimed in the context of the method. In this case, the functional features of the method are embodied by structural units of the system and vice versa, respectively. Generally, in computer science, a software implementation and a corresponding hardware implementation are equivalent, at least from a computability perspective. Thus, for example, a method act for "displaying" data may be performed with a display unit (monitor, screen) and respective instructions. For the sake of avoiding redundancy, although the renderer may also be used in the alternative embodiments described with reference to the method, these embodiments are not explicitly described again for the device.

Generally, the features and embodiments, mentioned herein or claimed, may be combined selectively.

In one aspect, a method is provided for interactive editing of volumetric image data. The method includes receiving a dataset with volumetric image data, which have been acquired from an image acquisition modality; displaying the received volumetric image data; providing a signed distance field data structure of the received dataset, wherein in particular the signed distance field is auxiliary to the volumetric image data (or anatomy volume data), where it is a representation of the distance to a segmentation object, or a specific structure of the anatomy data; receiving editing operations from a user interface for editing at least a part of the provided signed distance field data structure; and calculating a visualization of the editing operations.

Preferably, the method may further proceed with displaying or rendering the calculated visualization on a display.

In contrast to prior art, differentiating aspects relate to: applying a raycasting algorithm for preview and continuous/layer depth picking; and/or applying a path tracing algorithm for photorealistic final rendering; and/or realtime construction of (one or several) SDFs, combining segmentation algorithms and SDF/geometry/data-assisted brushes.

The technique described herein involves high quality rendering with SDFs, but in the context of interactive volume editing. The latter is where the differentiating parts of the algorithm are:

Interactive Editing: realtime construction of SDFs, combining data from pre-segmentation algorithms and SDF/geometry/data-assisted user-controlled brushes; and/or fusing registered SDFs from different sources, e.g., high resolution pre-segmentation, low-resolution and/or high resolution, hierarchical, adaptive resolution, etc. from interactive editing.

Rendering: direct and/or indirect SDF-based visualization techniques in support of the interactive editing/annotation workflow, e.g., using paint to define and pre-visualize areas marked for masking; and/or different rendering algorithms for interactive/lightweight versus final rendering in support of the interactive volume editing workflow (e.g., depth images with and without locking from the interactive raycaster during editing used to drive the brush strokes).

In contrast to several existing systems, the entire segmentation pipeline and in particular the method or system described herein, uses signed distance fields (SDFs), which allow for sub-voxel precision, significantly improved rendering quality and a number of specialized effects that are difficult to achieve with traditional voxel masks. The main focus is interactive editing and mask creation for medical data. The rendering of the result data, namely the calculated visualization of the editing operations, is optional.

A SDF encodes the distance to a specific object contained in the received dataset, e.g., an SDF is the distance transform of an organ segmentation. Generally, one or more SDFs may be used.

The system may also start with an empty SDF, which is then created entirely from editing operations.

The signed distance field as the native data structure enables smooth boundaries to be reconstructed even for low resolution data and enable live editing and segmentation workflows in high quality, as opposed to direct binary voxel rendering of the segmentation object.

Preferably, the methods and systems support real-time volumetric painting, sculpting, and erasing as part of both pre-processing and live annotation workflows.

In a preferred embodiment, the methods and systems may be used for support of educational and clinical workflows.

A major advantage of the solution described herein is the use of SDFs for the interactive editing operations, which e.g., enable annotations, advanced clipping and volume editing at sub-voxel resolution and independently from the imaging data. Further, it is allowed to combine segmentation data with the SDF operations. Further, the fact that the method does not require pre-processing of the volumetric image data, e.g., by providing segmented image data.

Volumetric image data may be medical image data, being acquired from a medical image modality, like e.g., MRI, CT, PET, SPECT, ultrasound, and others. The volumetric image data may represent an anatomical structure of a human or an animal. Other embodiments relate to non-anatomical objects (implants and/or artificial structures) in medical or anatomical volumes or to non-medical use for industrial applications, like failure analysis in e.g., chip technology.

Calculating the visualization is executed by executing at least one rendering algorithm. Typically, there is a first visualization of the received volumetric image data that is the basis for the editing operations. After or during performing the editing operations, a second visualization is calculated and displayed encoding the editing operations with respective functionality (marking, erasing etc.).

Interactive rendering may use any volume rendering technique, but high-performance ones may be preferable to maintain interactivity, such as interactive volume raycasting. For more details for the interactive volume raycasting it is referred to KRÜGER J., WESTERMANN R.: Acceleration techniques for GPU-based volume rendering. In Proc. of IEEE Visualization 2003 (2003), pp. 287-292. Final rendering may use the same or a different volume rendering algorithm that provide more realistic rendering, e.g., Monte Carlo volumetric path tracing, see e.g., Kroes T, Post F H, Botha C P (2012) Exposure Render: An Interactive Photo-Realistic Volume Rendering Framework. PLoS ONE 7(7): e38586.

In other embodiments, volume raycasting with raytraced shadows, deep shadow maps, ambient occlusions, and/or other global illumination effects, e.g., single- or multiple-scattering approximations, reflections, color bleeding are used.

Providing a signed distance field data structure means that a second data structure is generated on the basis of the volumetric image data, which is subject to editing and rendering. The term "second" is to be construed as "secondary to the anatomy image (received volumetric image data) and based on the anatomy image." With other words, in addition to the main data structure with or representing the volume data, an additional data structure is generated.

The editing of the volumetric image data and thus calculating the visualization of the edited volumetric image data may be done in a completely unrestricted manner. The user is free in determining parts to the volume for editing and/or is free to determine the type of editing. Editing may be a marking, shading, texturing, coloring and/or other types of editing parts of the volume or the whole volume. Editing may also be a highlighting or other type of interaction with the volume (e.g., temporarily highlighting without saving). Further, a set of functions may be used, e.g., by activation a short cut key combination of a keyboard and/or by mouse input of the user prior or during performing the editing operation. So, a specific function is determined for processing the marked structure in the volumetric image data. Processing may include erasing the edited sub-structures, changing, and/or annotating the same. Editing is executed in runtime. The user directly interacts with the SDF data structure. In case several editing operations are performed, multiple SDFs are generated and stored. The SDFs are updated upon user interaction.

Further, multiple operations can be performed on the same SDF as well. For instance, it is possible to perform multiple paint operations (as editing operations) SDF, and to perform multiple paint operations to paint out ribs in one SDF and skull in another SDF. This provides more flexibility. The different editing results may be stored separately. So, the basic anatomic structure upon with the editing operations (edits) have been performed are stored redundantly.

The SDFs are separate 3D images, which are registered to the received volumetric image data, which serves as a primary anatomy image (or primary volume). All operations are performed on the SDFs only, but during rendering of the primary anatomy image, the SDFs are sampled to implement the various effects, e.g., changing the optical opacity of the anatomy based on the distance encoded in the SDF.

The visualization of the editing operations (i.e., rendering) may be configured. For example, the editing may be visualized as 3D textures in the edited volume and/or colored in specific preconfigured colors. Different representations of a final effect of the editing operations may be provided (e.g., semi-transparency during erasing vs. full transparency for final rendering).

In certain embodiments, the calculated visualization may be direct and/or indirect or combined. This may be set depending on the particular workflow.

Direct visualization of the SDF would show the distance value encoded in the SDF e.g., as color during rendering or e.g., a text label under the mouse cursor. For example, displaying the distance value itself as text is direct visualization. Volume raycasting of the SDF as an iso-surface is another example for a direct visualization. An iso-surface or any level-set rendering technique may be used as well. Using colored glyphs to visualize the SDF, where the color encodes the distance is also an example of direct visualization.

Using the distance value to color a structure in the anatomy would be indirect rendering. Indirect visualization would modify the primary volume rendering based on the distance information, e.g., preview an erase operation by changing the optical color and/or opacity of the anatomy data during volume rendering.

The distinction is that there is no modifying of the other parts of the rendering processing and no applying the color to the main anatomy data (volumetric image data).

In a preferred embodiment, editing operations are performed by masking of the volumetric image data during performing the editing operations, based on values of the SDF, which in particular may be sampled with some reconstruction filters. Masking is, thus, one example of an operation that can be performed using the distance data from the SDF.

Masking or a mask-based algorithm uses a mask to edit specific parts of the volume. The mask may be reconstructed by using linear or non-linear filters for achieving pre-defined smoothness properties. In a preferred embodiment, B-Spline filtering may be used. For more details, it is referred to Sigg, Christian, Hadwiger, Markus, Fast third-order texture filtering. GPU Gems 2. p. 313-329. 2005. Preferably, filtering is done when sampling the SDFs during rendering operations. Examples of non-linear filters could include e.g., anisotropic, view-dependent, morphological and/or stochastic filters. Alternatively, or cumulatively the masks may be generated by using a segmentation algorithm.

In a preferred embodiment, the SDF is initialized from an existing segmentation (e.g., a bone or organ mask) or combine it into an existing SDF. This way, the interactive editing tools may be used to refine the segmentation mask.

In another preferred embodiment, the editing operations are performed by using a brush-based algorithm. In other embodiments, other algorithms may be used, for implementing user-defined editing operations, i.e., the editing operations are based on user interaction. Alternatively, the editing operations may be automatic. Then, editing operations are implemented by algorithmic instructions and are not based on user interaction.

According to a preferred embodiment, the rendering system or method establishes a mapping between the rendered image (calculated visualization) and the 3D patient space (e.g., through viewing and projection matrices for perspective cameras). So, for example, brush strokes on screen are then mapped to brush strokes in the 3D patient space through the use of depth data produced during volume editing.

In a preferred embodiment, the anatomy and SDFs are registered to each other in patient space and that registration is used when applying editing operations on the SDFs. This registration specifically allows the anatomy and SDFs to be of different resolutions. E.g., high-resolution SDFs from offline segmentation algorithms, combined with lower resolution SDFs for faster interactive painting/editing; also, anisotropic data from the scanner (e.g., thick slices), combined with isotropic SDFs for more consistent handling of brush operations.

The brush-based algorithm may use brush strokes in the volume by using an interaction tool (like e.g., a mouse) and a modifier key, wherein the modifier key has a determined functionality, e.g., for marking volumetric structures and/or erasing the same. A brush stroke is a user interaction signal, which may be thought of as a painting brush in a volume.

The brush-based algorithm uses the brush strokes in the volume as input and calculates in reply to this voxel data, which correspond to the location in the SDF data structure for identifying the location in the SDF.

When brush input is received, an algorithm updates all voxels in the neighborhood of the brush position with distance from the brush position. This information is later used during rendering to determine the edges of the brush stroke.

When volume is rendered (with or without SDF), a depth image is also generated that may be used optionally to do paint or editing operations on the "visible surface" of the volume dataset when using for e.g., mouse and 2D screen.

This is not strictly necessary though. Other embodiments relate to editing or painting using a virtual reality (VR) headset and a 3D controller, and this information can be used to create a 3D stroke. The depth of volume data in this case is not relevant as the brush input has its own depth information.

So, when receiving a brush stroke within a particular part in the volume, it may be determined automatically to which anatomical part the brush stroke is related to or in which depth the brush stroke was executed in order to be able to transform the editing signals in the SDF structures to the corresponding volumetric image data (position correlation between displayed volumetric image data and the SDF data structure).

In a preferred embodiment, two types of editing operations are executable. First, organ-specific editing operations may be performed. Thus, it may be determined automatically to which organ the editing operation, e.g., performed by a brush stroke, relates to, e.g., a rib, or bone, or organ (heart, liver etc.). This, however, requires pre-processing the data, in particular by executing a whole or part body segmentation algorithm. Second, the solution, presented herein, also covers a case where the voxel classification during volume rendering (calculation of the visualization) modifies the SDF editing operations (e.g., erasing only voxels within a given Hounsfield unit (HU) range). This can be done through the classification function alone and without prior segmentation.

According to another preferred embodiment, the method may be used recursively. Recursive editing would entail making the SDF the primary 3D volume with some direct visualization method, and then using editing operations directly on that.

An example of fully recursive editing would be to use the SDF tools on the anatomy data to create a first SDF, then switching to direct rendering of the SDF (e.g., using an iso surface or other level-set methods), defining a secondary SDF, and using the SDF tools to modify the first SDF itself.

Using a secondary paint operation e.g., to undo a first paint operation is, however, in a preferred embodiment, implemented as another logical operation between two independent paint operations on the primary anatomy volume, before committing to an SDF (and thus is considered as iterative application).

According to another preferred embodiment, the method may be used iteratively by using the calculated visualization, encoding the performed editing operations, as volumetric image data for performing further editing operations in the calculated visualization that iteratively are displayed as further calculated visualizations. This has the technical effect that correction measures may be applied to the calculated visualization by performing further editing operations, for e.g., erasing volume parts or marking the same.

An example for an iterative editing operation may be given by the following sequence: taking an image of the received volumetric image data, applying the editing/painting/annotating/etc., re-rendering the image, and then using the new image to define a further editing operation. A specific medical example would be first performing skull stripping first, then in an iterative act, and based on a rendering with the skull removed, painting the now exposed voxels of the brain or vessels in the head.

A separate or second iterative editing operation would "bake" the results of a first editing act into the volume data. Thus, the editing is embedded in the volume data, in particular inextricably embedded therein. Thus, preferably, the editing operation has modified the original anatomy voxels. Then the editing would continue, based on a rendering of the modified data. This accumulates the edits into the anatomy volume data, whereas the previous example accumulates edits into the SDF data.

According to another preferred embodiment, a plurality of corresponding or different editing operations are performed for different parts of the volume to be represented in common in the calculated visualization.

For example, the editing operations may refer to highlighting specific first anatomical structures in the volume with a first visualization and highlighting second structures in the same volume with a second visualization. Thus, e.g., broken ribs may be colored red, whereas intact ribs may be colored green.

According to another preferred embodiment, calculating the visualization of the edited volumetric image data uses a segmentation algorithm or SDF-based brushes or manually indicated edits.

The segmentation algorithm may be a fully automatic segmentation algorithm, in particular, e.g., a deep-learning based or model-based organ auto-contouring. Alternatively, the segmentation algorithm may be a performed at least in part by user interaction, in particular, e.g., by applying region growing segmentation. Alternatively, SDF-based brushes may be applied. The brush may be of a static shape (e.g., a sphere, cylinder, etc.), which is voxelized during SDF editing operations, e.g., distance values of the SDF voxels covered by the sphere are updated. Alternatively, the brush may be defined as a static or dynamic SDF itself, e.g., the brush SDF is adapted based on some anatomy image metric such as gradient magnitude. Applying the brush to the SDF then involves SDF logical operations.

According to another preferred embodiment, calculating the visualization of the editing operations, and thus of the edited volumetric image data, is executed by directly transforming and embedding user-defined editing operations in a three-dimensional space in the signed distance field data structure of the volumetric image data. The term "directly embedding" relates to the fact that rendering the calculated visualization is executed in parallel or together with the editing. There is no first rendering of volumetric image data and subsequently a second separate rendering of the editing operation(s), instead both acts are executed in common.

In another preferred embodiment, calculating the visualization of the edited volumetric image data is based on a rendering algorithm, in particular a raycasting algorithm. For details of the raycasting algorithm, it is referred to KRÜGER J., WESTERMANN R.: Acceleration techniques for GPU-based volume rendering. In Proc. of IEEE Visualization 2003 (2003), pp. 287-292. Other possibilities include volume raycasting with raytraced shadows, deep shadow maps and/or ambient occlusions.

Preferably, a subset of volume rendering illumination techniques is selected for application and use during interactive rendering, namely the ones with lower render and refresh times.

Alternatively, or cumulatively, to applying Monte Carlo Path tracing algorithm, other rendering algorithms may be applied, e.g., see, "A Survey of Volumetric Illumination Techniques for Interactive Volume Rendering" by Daniel Jönsson et al, COMPUTER GRAPHICS forum, Volume 0(1981), Number 0 pp. 1-25.

In still another preferred embodiment, for displaying the received volumetric image data, a first rendering algorithm is used and for calculating the visualization of the edited volumetric image data with the performed editing operations, a second rendering algorithm is used, in particular a level-set algorithm for calculating a smooth segmentation boundary representation from a SDF volume.

The first and second rendering algorithm may be the same. The second rendering algorithm may be a level set algorithm, which discretizes the whole volume and defines a function phi instead of evolving a curve. Generally, level set methods in rendering involve e.g., thin and thick iso-surfaces for visualizing scalar fields. More details of a level-set algorithms may be found in A. E. Lefohn, J. M. Kniss, C. D. Hansen and R. T. Whitaker, "Interactive deformation and visualization of level set surfaces using graphics hardware," IEEE Visualization, 2003. VIS 2003., Seattle, WA, USA, 2003, pp. 75-82, doi: 10.1109/VISUAL.2003.1250357.

The SDF is an implicit representation of a segmentation object, where the zero-level set is the surface of the segmentation object and for every 3D location the SDF can be sampled to compute the distance to the segmentation object. The level set is used directly during rendering.

Sampling the SDF with a reconstruction filter recovers the smooth distance to the boundary for any position in patient space. According to an embodiment of the solution, described herein, this is used together with the sampling and classification of the anatomy data to implement the volume editing, clipping and/or annotations.

In still another preferred embodiment, calculating the visualization of the edited volumetric image data uses a set of voxel classifiers for classifying different volume properties, such as different colorization values, different opacity values, and/or different shading techniques. The classification (or classifiers, respectively) in volume rendering maps scalar values in the imaging data (e.g., in HU for CT data) to optical properties (e.g., color, opacity, absorption/extinction coefficients for 1D transfer functions), which are integrated during rendering. Transfer functions may map data gradients or local shape descriptors to optical properties.

In still another preferred embodiment, the editing operations are encoded and visualized as a paint mask in the displayed calculated visualization, in particular as a semi-transparent paint layer, wherein the paint mask can be configured individually.

In still another preferred embodiment, an Undo/Redo function is provided for the editing operations. A technical advantageous effect of this features is to be seen in that computation power may be saved and efficiency improved. This is because SDFs may be reconstructed from stored brush strokes and SDF operations may be part of undo/redo. Further, the method may preferably be optimized by dynamically computing a set of checkpoints so only a subset of operations needs to be re-applied.

Generally, the solution described above, using the SDFs, allows for editing operations at subvoxel precision that are also fully decoupled from the volume data, compared to traditional voxel-based volume editing. The method is more efficient and scales to a larger number of operations than purely procedural volume editing.

External segmentation, static/geometric brushes, and static/adaptive SDF-based brushes are combined in a unified SDF-based volume editing system.

In another aspect, the solution presented herein, refers to a renderer for interactive editing of volumetric image data. The renderer is configured to execute the method for interactive editing as described above. An image interface is configured for receiving a dataset with volumetric image data, which have been acquired from an image acquisition modality. A memory interface to a memory is configured to store a signed distance field data structure of the received dataset. A display interface to a display is configured for displaying the received volumetric image data. A user interface is configured for performing editing operations for editing at least a part of the displayed volumetric image data. A processing unit (image processor) is configured for calculating a visualization of the performed editing operations.

The processing unit may further be configured for instructing a second display to display the calculated visualization. The display and the second display may be the same.

In another preferred embodiment, the processing unit may be a graphics processing unit or a central processing unit. The processing unit is configured to execute at least one algorithm and is particularly configured to execute the method for interactive editing as described above. The processing unit provides control signals for instructing a display device to show the calculated visualization.

In another preferred embodiment, the display and the user interface may be implemented in the same module or computer. For instance, the display may be provided as a graphical user interface and thus also serves as user interface.

According to a preferred embodiment and use of the present embodiment, the method may be used in educational and/or clinical workflows.

In particular, in distributed scenarios, where a plurality of users is working at different computing locations (for example if the teachers are located at the first position and the students are located at a different second position, which might be the case in home schooling scenarios or virtual applications), it may turn out as very advantageous effect that the user interface, which is configured for performing the editing operations on the signed distant fields, is implemented on a first computing entity, whereas the second display for displaying the editing operations is implemented on a second computing entity. With this deployment, it is possible that editing operations are performed on the first computing entity and the result of the editing operations are displayed on a second computing entity, which may be used by the teacher to assess and track the student's editing operations. For this setting, the teacher may instruct the student to perform specific markings on the volume, which the student then needs to apply. The result will be displayed at the distant display of the teacher.

The method, suggested herein, may be applied for collaborative annotations in both teaching and clinical scenarios and in other scenarios of distributed editing/rendering. For example, a lecturer with a tablet running preview rendering may do real-time annotations to be displayed during lectures in high quality.

Distributed annotations, to be used e.g., in education are important use cases and the methods provided herein have the specific technique benefits:
(1) Unified handling of pre-segmented data together with live annotations, e.g., during lecture.
(2) Fusion and unified handling of SDFs from different sources, e.g., low-resolution SDF edited during a live lecture from a low-power tablet device, combined with collaborative editing/annotating from an export on a workstation (enabled by support for multiple registered SDFs).
(3) Fusion of multiple rendering algorithms for different display devices during editing, e.g., raycasting on tablet, raycasting in combination with global illumination on a workstation, path tracing on lecture hall display.

According to another aspect, the solution described herein relates to a computer program product including program elements which induce a computer to carry out the acts of the method for interactive editing of volumetric image data as described above, when the program elements are loaded into a memory of the computer.

According to still another aspect the solution described herein relates to a computer-readable medium on which program elements are stored that can be read and/or loaded and executed by a computer, in order to perform the acts of the method for interactive editing of volumetric image data as described above, when the program elements are executed by the computer.

The realization of the embodiment by a computer program product and/or a computer-readable medium has the advantage that already existing workstations (e.g., postprocessing servers) or clients can be easily adopted by software updates in order to work as proposed by the embodiment.

The computer for executing the method for interactive editing as described above and in particular for executing related algorithms, mentioned above, may be a personal computer or a workstation in a computer network and may include a processing unit (processor), a system memory, and a system bus that couples various system components including the system memory to the processing unit. The computer may be implemented in or as a data processing system. Said data processing system may thus include a computing device or a cluster thereof. The data processing system includes a processing unit and storage, which are in data communication with one another. The processing unit may consist of or include a CPU and/or a GPU and includes several modules configured to perform the acts of the method of the present embodiment.

A computer program may be stored on a suitable medium, such as an optical storage medium or a solid-state medium, supplied together with or as part of other hardware, but may also be distributed in other forms, such as via the Internet or other wired or wireless telecommunication systems. The computer program may be or may include an executable for execution on a processor or processing unit. The computer program may be provided in distributed manner, and may thus be distributed between several computing entities, such as processors. For example, the computer program may be distributed (stored) on different computing entities, like a set of clients (acting in a distributed medical system with a plurality of medical treatment devices) and a server, so that a portion of the computer program (e.g., the acts of receiving and displaying the received volumetric image data) resides on a first computing entity and another portion (e.g., the rest of the method acts, inter alia, providing, performing, calculating and displaying the calculated visualization) resides on a second entity. The computer program may include program modules, which may include routines, programs, objects, components, data structures, etc. to instruct the computer to perform a task(s) by data processing in particular of abstract data types.

The display may be provided as a monitor. The display may be connected wired or wirelessly to the renderer by the display interface. It may be a touch display. The display may be connected directly to a processor (e.g., medical scanner, VR/AR headset).

The embodiment makes use of a set of algorithms. An algorithm is, in particular, a collection, e.g., a sequence, of instructions for processing input information to obtain output information. The instructions of an algorithm may be implemented in a computer and executed by a processor e.g., of the data processing system according to the present embodiment. In particular, the input information of the algorithm is encoded in input data (here: dataset with volumetric image data) that may be accessed by the processor carrying out the algorithm. In particular, the processor processes the input data according to the instructions of the algorithm to generate output information, which, typically, is encoded in output data (here: the calculated visualization to be displayed on the display). According to one embodiment, in particular, an algorithm processes data when the algorithm includes instructions, which, when executed by a processor, cause said processor to process these data.

The order, according to which the acts of the method are described in the present specification, does not necessarily reflect the chronological order, according to which said acts are carried out. In particular the acts of displaying the received volumetric image data and calculating a signed distant field data structure may be executed in parallel or in another sequence. Further, the acts of displaying the received volumetric image data and displaying the editing operations may preferably be executed online and in parallel, which allows highly interactive editing.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DESCRIPTION OF THE FIGURES AND PREFERRED EMBODIMENTS

The present embodiments relate to interactive editing, in particular to interactive volume editing and rendering. In contrast to several existing systems, the entire segmentation pipeline uses signed distance fields (in the following also abbreviated as SDF), which allows for sub-voxel precision. This significantly improves quality of the display/rendering of the performed editing operations.

First, annotations in the volumetric image data are possible. In particular, the system provides the option for interactive marking of findings, highlighting of structures, toggling of structures, with smooth boundary handling at the segmentation surface as well as combining user defined and algorithmic (i.e., automatic) annotations.

Second, advanced clipping is possible. In particular, the system provides the use of complex analytical shapes with a sharp clipping surface without artifacts (e.g., staircase artifacts).

Third, volume editing is possible. In particular, the system provides removal of artifacts or sub structures in the volume by performing editing operations. Further, structure enhancement, isolation and color isolation of substructures is possible. Further, SDFs generated from user interactions and algorithms may be combined.

In the example, shown in FIGS. 10 to 13, the method is shown by using the proposed SDF based volume editing system together with a cinematic renderer.

The examples, explained below, show multi-SDF workflows, including e.g., undoing paint or editing operations in some of the SDFs, etc.

Usually, markings may include colorings. However, colorings are not allowed in patent documents, therefore a hatching is used. The color "red" may be represented in the figures with a left diagonal lining or hatching (starting form left downward to the right upward) and the color "green" may be represented with a right diagonal hatching.

Figure 10:
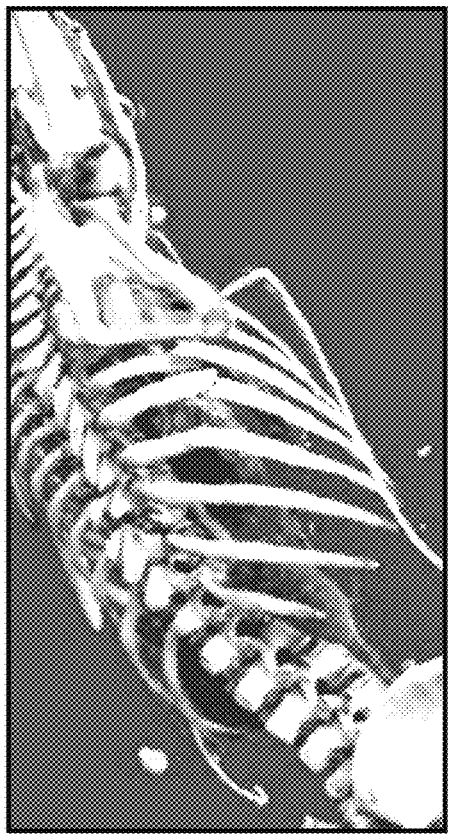
FIG. 10 is an example image of a three-dimensional image dataset.

FIG. 10 shows a volumetric image data, representing a shoulder blade and a catheter by way of example. In this volumetric image data, the user may perform editing operations by applying different markings for different structures in the displayed image. The operations, generally, may be directed or applied to anatomical structures, shown in the image (e.g., organs, bones etc.) or to artificial structures, also shown in the image (e.g., catheters, implants etc.).

Figure 11:
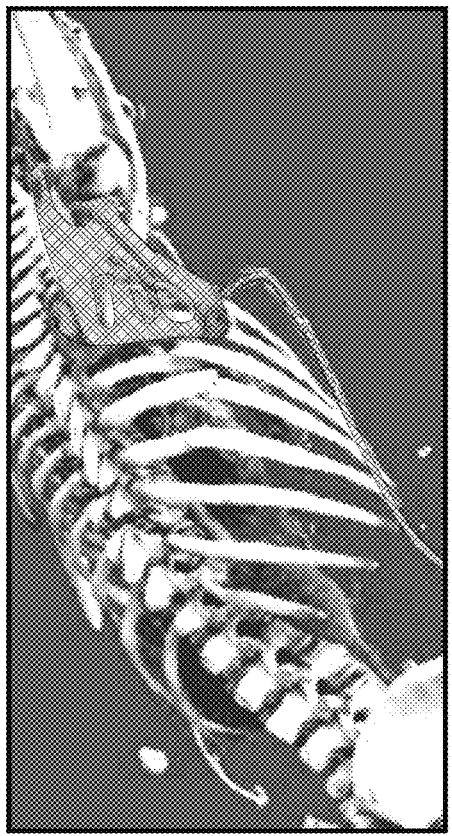
FIG. 11 shows the example, shown in FIG. 10 with visualized first editing operations.

As shown in FIG. 11, a first editing operation, here a preliminary marking for performing a subsequent second editing operation, here an erasing operation is executed for later erasing or removing the shoulder blade and the catheter. The result of the first editing operation (marking) is shown in FIG. 11 with a cross pattern.

Figure 12:
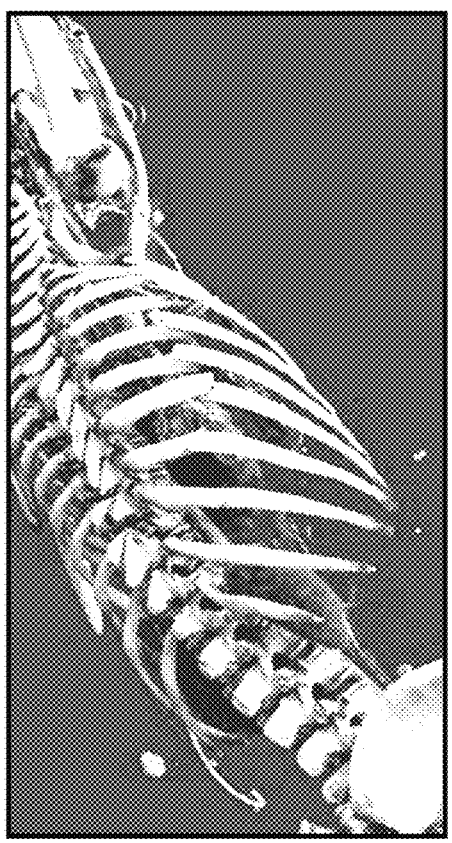
FIG. 12 shows the example, shown in FIG. 10 and FIG. 11 with the effect of the first editing operations, in particular, erasing operations by displaying a calculated visualization.

The result of the second editing operation (erasing), represented in the calculated visualization, is displayed and shown in FIG. 12. Here, it can be seen, that the shoulder blade and the catheter are no longer present in the image and have been removed, according to user-defined editing operations instructions.

Figure 13:
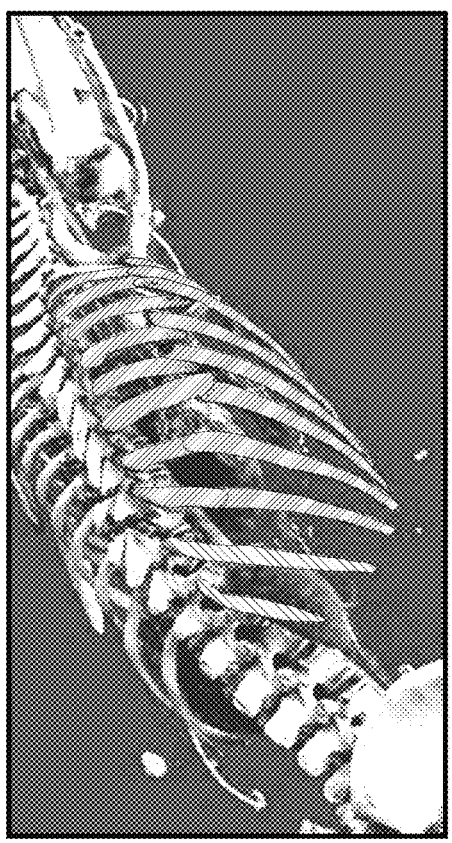
FIG. 13 shows the example, shown in FIG. 10 to FIG. 12 with visualized second editing operations, in particular, two different marking operations for two different types of structures in the volumetric image data.

As shown in FIG. 13, a second type of editing operation, namely a marking or highlighting is applied for visually differentiating between two different structures in the image, in particular between intact and broken ribs. Thus, a first marking operation (here: coloring green, which is represented in the figures with a hatching to the upper right) as editing operation is applied to the two intact ribs, shown in the displayed volumetric image data, positioned on the left side of the rib structure, represented in FIG. 13 with a right diagonal hatching. In addition, a second marking operation (here: coloring red, represented in FIG. 13 with a left diagonal hatching) as editing operation is applied to the remaining broken ribs, shown in the displayed volumetric image data, positioned on the right side of the rib structure. The result with the calculated visualization of these two different markings or highlighting is shown in FIG. 13. As can be seen, two ribs are intact. These two ribs are displayed with a first marking (e.g., in green color); the rest eight ribs are displayed with a second marking (e.g., in red color), both shown in one common single representation.

The system is used for interactive editing, which means, that after the editing operations has been received the calculated visualization of these editing operations are instantaneously calculated and rendered. So, the system is an online system with high performance during interactive editing. In particular different volume editing operations, like painting, erasing, sculpting, complex clipping, are visualized with high quality. Generally, high image quality is of rising importance across the industry, especially with the adoption of high-end display devices, like OLED panels for example in the medical domain, and by providing photorealistic editing techniques, such as volumetric path tracing for medical data, where low quality segmentation rendering may not meet the rising user expectations.

In particular, each voxel of an SDF encodes the signed distance to the nearest point of a segmentation surface, in contrast to binary masks, which only describe the containment of the voxel center in the segmented object. Using an SDF allows for a smooth surface to be reconstructed using fewer voxels than with binary representation, inter alia, during rendering. It is possible to pre-compute the distance transform of a binary mask or apply some other smoothing algorithm in a pre-process and/or interactively, but the additional processing slows down the performance during editing (in general). Reconstruction filters can then recover the smooth segmentation surface with a significantly reduced voxel resolution, while arithmetic operations allow for a wide range of editing possibilities.

The rendering or the method for interactive editing as suggested herein targets both physically-based volume rendering (e.g., volume path tracing the renderers) and interactive ray casting. Moreover, while the described segmentation workflows are primarily used for anatomical education with real-time volume rendering, parts of the method and/or system generalize well to surface-based models, fused volume+surface models, non-medical volume data (e.g., industrial CT scans for example used in failure analysis in chip technology), and/or non-real-time systems, e.g., used for producing pre-rendered videos.

In a preferred embodiment, the method and/or system is GPU-based with a graphics-based implementation of the proposed technique. Other embodiments may employ a GPU (graphics processing unit) computing pipeline (e.g., CUDA, OpenCL) or a non-GPU-based rendering pipeline (e.g., Intel OSPRay).

According to a preferred embodiment, the system and/or renderer include the following components: the three-dimensional volume rendering engine with support for auxiliary three-dimensional textures in addition to the anatomy three-dimensional textures; real-time generation, management and updates of multiple SDFs encoded in three-dimensional textures; runtime interaction with SDFs, including user-based editing operations of the SDFs (for example by applying SDF brush strokes) and algorithmic editing operations of the SDFs (for example by segmentation algorithms); and direct and indirect visualization of the SDFs during volume rendering.

The basic volume editing primitive in the method, system or renderer described herein, is the SDF, which defines both the volume editing masks and the editing brushes. The brushes can be either purely mathematical operations on the mask SDF or in more complex cases, rasterized shapes into separate SDFs. Some examples include: various 3D or extruded 2D geometrical shapes (e.g., sphere, cube, cylinder), 3D spline extrusion (e.g., circular extrusion of 3D centerline with spherical caps), and complex shapes described by curves and dynamic SDFs that adapt to the volumetric data being edited. For example, a vessel detection algorithm may be used to automatically select, size and orient a cylinder brush when editing parts of the anatomy volume that contain vessels.

In particular, vessel detection and/or vessel segmentation that consists of accurately extracting the whole vascular volume or the vessel medial axes is a crucial task posing complex image processing issues and hurdles for the underlying data processing. Non-exhaustively, model-based, region-growing, level-sets and machine learning approaches may be cited in this context. For vessel filtering, some approaches, rely on the contrast and geometric properties of the vessels. So, e.g., it may be generally assumed that the observation of the local curvatures via the Hessian matrix analysis can allow for the determination of the position and orientation of the putative vascular structures.

Thus, in a preferred embodiment, the centerline tracing and vessel diameter estimation are performed from the vessel lumen mask, and then that information may be used to define the brush size, e.g., compute the distance from the editing location to the vessel centerline and use the vessel diameter at that location to drive heuristics for the brush size. Alternatively, an SDF of the vessel tree may be computed to speed up the queries. Generally, in another preferred embodiment, pre-segmented structures are converted to SDFs and this process act and/or information is used for adapting the brushes.

In some embodiments, the volume of effect for a given brush may be constrained to a specific iso value of the brush SDF; alternatively, the distance to the zero level-set may modify properties of the brush (e.g., smooth falloff of brush hardness), or may define global mask operations (e.g., mask punch effect through the entire volume).

The fundamental editing workflow involves creating a paint mask SDF consisting of one or more brush strokes, each defined by one or more brush inputs. Once a brush stroke is applied to the paint mask, it can be committed to a permanent mask or it can be discarded. Inverse operations can be performed on the paint mask as well, resulting in the brush strokes removing 3D shapes from the paint SDF. This is achieved using Boolean operations between existing values in the paint mask and the brush inputs (Jones, Baerentzen, & Sramek, 2006). For example, given SDF values d1 and d2, the resulting value of SDF subtraction is defined as max (−d1, d2). An already committed SDF mask can also be edited in a similar way, by copying the SDF values from the mask to the paint SDF, performing the editing operations and committing the result to the permanent SDF mask.

The following passage describes an example implementation of a (paint) editing operation: input is two textures—committed SDF and active paint SDF; initially, committed SDF is copied to the active paint SDF; during editing the active mask is updated based on the paint mode and stroke mode; the uncommitted paint regions are rendered differently (e.g., in different color) by comparing active and committed textures; when editing is completed, the active paint SDF is copied directly to the committed SDF; alternatively, the active paint SDF is initially empty, brushes are applied and the final act uses SDF operations to commit the new paint.

Depending on the system architecture, the paint editing operations may be implemented as an OpenGL compute shader, a CUDA kernel, or a variety of other methods (e.g., running purely on the CPU), which are executed for the parts of the voxel data covered by the brush stroke. Various optimization approaches may be implemented, including hierarchical data structure for the SDFs, adaptive resolution for the active paint SDF and/or the committed SDF, and progressive updates of the SDFs.

In a preferred embodiment, various compression modes may be used, such as distance data quantization or wavelet compression.

In an alternative preferred implementation, the mask SDF could be created using a fully automatic segmentation algorithms (e.g., organ segmentation) or partially automatic algorithms (e.g., region growing from user-placed seed points or flood-fill of iso-contours). Combinations of SDFs from automated algorithms and user-directed paint or editing operations may be used as well.

As a variation of the fundamental workflow, volume data classification can be used during paint or editing operation to limit the paint area to achieve selective painting effects. This can be used to precisely paint or remove certain types of structures while avoiding others nearby (e.g., painting individual ribs).

One embodiment of the system uses a volumetric hit test to define the brush strokes in 2D anatomy data. The system generates one or more depth images during the rendering process (see Patent Application No. US20180227568A1) and the hit test is performed by querying the depth values at specific pixel locations.

In some scenarios, this issue is solved by creating a copy of the depth texture every time it is updated during rendering, and using the copied texture for picking. This allows to perform efficient picking operations without blocking the renderer running on a separate thread.

An alternative embodiment may generate one or more iso surfaces from the volume data and select 3D brush stroke positions based on mesh picking.

Because the paint mask can be configured for different visualization effects, such as color paint and erase, when using eraser for visualization, the depth buffer is updating continuously. This allows erasing continuously as upper layers of the volume are erased. In an embodiment, the depth buffer copy is not updated once the stroke has started, which allows the user to pick and erase only the parts of the volume visible before stroke starts and protects the rest of the volume data from unintentional editing. This is useful when erasing structures are very close to other structures as well as overlapping structures.

Layered operations using paint masks allow discarding a set of operations and comparing the before and after versions of the mask before committing to the permanent mask. Undoing an operation after committing to the mask is possible by using the active paint SDF as a paint clear operation using the clear mode, which is a manual operation and may not result in exact same mask before the operation.

The system implements undo operations by keeping track of brush strokes and regenerating the SDF masks from a subset of strokes. In certain embodiments, the cost of regenerating the complete SDF each time may be prohibitive, and the process is accelerated by caching the SDFs after a certain number of strokes. When an undo operation is performed, the SDF mask checkpoint closest to the new list of strokes (after removing certain strokes) is loaded and only the missing strokes are reapplied using SDF operations.

As a variation of a fundamental workflow, multiple individual masks, representing various segmented structures of the volume dataset can be combined together into a single mask using Boolean operations for a specific use case, thus allowing for a reduced memory footprint and performance impact of operating with multiple masks during runtime, while same time preserving the flexibility and ease of individual masks.

SDF-Based Rendering

The SDFs allow for a number of visual effects to be implemented as part of the volume rendering pipeline, which may be implemented as a single selected option or may be implemented all and their use affects various components of primary volume rendering algorithm:

1. Ray generation—e.g., different or adaptive sampling rates for paint textures or painted regions of the anatomy; adaptive sampling rates during interaction; empty space skipping may be affected by SDF-based erase operations.
2. Reconstruction filters—various types of linear or non-linear interpolation filters can be used to achieve various smoothness properties of the SDF reconstruction. For instance, high order B-Spline interpolation for distance reconstruction during paint rendering may be applied.
3. Volume data classification—queries into the SDFs are used to modify the optical properties derived from anatomical voxel data, such as specifying a different colorization (paint), different opacity (erase and sculpt), or other color pattern kernels can be applied for highlighting. Alternatively, a different classification than the one used to render the volume can be used to render the masked region.
4. Volume data shading—different material and lighting properties are modified based on SDFs, including material shininess, refraction and locally-adapted light direction.

Because the masks in the method and system according to the solution, presented in this application, are encoded as SDFs, accurate segmentation boundaries can be recovered with sub-voxel accuracy even for volumes with low voxel resolutions and anisotropic voxel dimensions when using a higher-order reconstruction filter (e.g., GPU accelerated B-Spline interpolation). In the case of high-resolution anatomy data, this feature can be exploited to achieve visually similar results while using lower resolution SDFs.

In an embodiment, the difference between multiple permanent masks is visualized at runtime using Boolean operations as a guide for user-created paint brush strokes. As an example, an SDF is generated and contains the subtraction between an automatic body segmentation SDF and the current mask. That SDF is visualized as semi-transparent paint layer with a different color from the current paint color.

In an embodiment, certain SDF effects, such as erasing, may be applied to the volumetric image data as a pre-process or pre-application effect and the resulting volume is used for direct volume rendering. The masking and/or other editing operation is/are baked into the volume data. In particular, paint/colorization and/or the masking can be baked into the volume data, but with significant implications for volume rendering quality and efficiency (rendering may be faster). Thus, the rendering performance is increased (sampling an auxiliary volume is no longer required) at the expense of reduced visual fidelity (signed distance information is not available during rendering, e.g., boundary smoothing cannot be used). In some applications, the above effects may be applied based on separate SDFs during rendering, even without caching of the pre-processed volume edits (referring to the stages within the volume raycasting loop, and not pre-classifying the data before it is passed to the rendering algorithm).

The system supports visualization effects defined by multiple committed and temporary SDFs, where the effect of each SDF can be toggled individually and all effects are composited at runtime. As an example, weighted alpha blending may be used to combine the colors and opacities of multiple overlapping paint layers.

Figure 1:
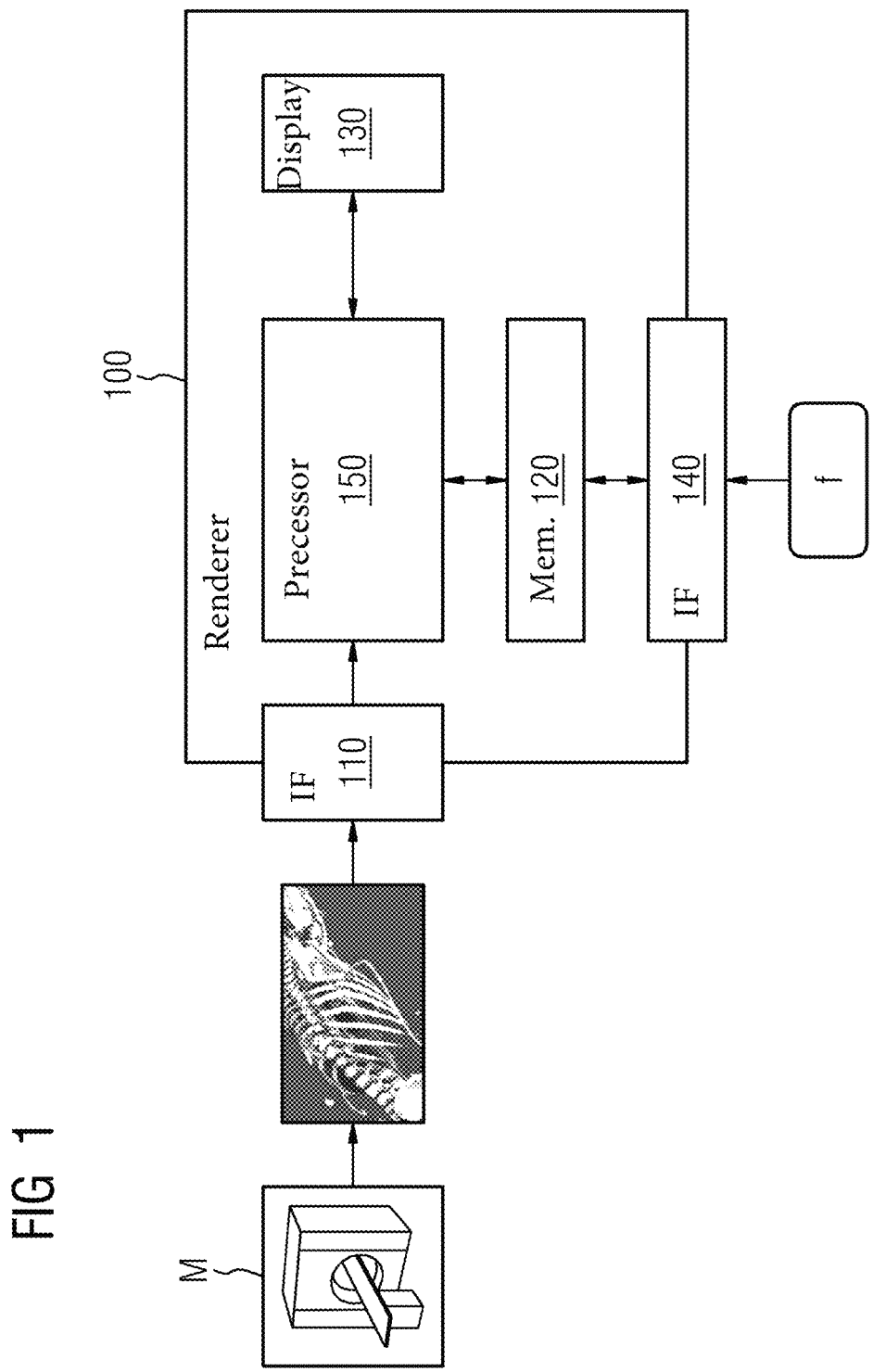
FIG. 1 is a schematic overview figure of a renderer for interactive editing according to a preferred embodiment.

FIG. 1 shows a renderer 100 for interactive editing of three-dimensional image data. The image data may be acquired by a medical modality, like a computer tomography device, a magnetic resonance imaging device, an ultrasound device and/or other. The dataset with the volumetric image data is received via an image interface 110, which is configured to receive the volumetric image data. The renderer 100 further uses a memory 120 for storing a signed distance field data structure, which has been created for the received dataset. The memory 120 may be directly embedded in the renderer 100 (as shown in FIG. 1 or may be provided as separate unit and connected via an interface. The renderer 100 further is connected to a display 130 for displaying the received volumetric image data. A user interface 140 is configured for performing editing operations for editing at least a part of the displayed volumetric image data. As described in the example above of FIGS. 10 and 11, the editing operations may relate to highlighting or marking certain substructures of the volumetric image data, for example ribs. In particular, the first function may be applied for performing first editing operations (green marking) for a first part of the volume (intact ribs) and another second function may be applied for performing second editing operations (red marking) for a second part of the volume (broken ribs). Generally, different functions f for performing the editing operations may be provided. For example, a function may be provided for annotating Data, another function may be applied for marking data with a first marking, another function may be applied for marking data with a second marking and so on and so forth, moreover, functions may be provided for clipping data etc.

The renderer 100 further includes a processing unit 150 which is configured for executing an algorithm for calculating a visualization of the editing operations. The algorithm may further instruct a second display to display the calculated visualization, namely with the editing operations, being embedded with the volumetric image data (for example as shown in FIG. 11 with the hatched and dotted markings). In this example, the display 130 and the user interface 140 are different entities, which brings the advantage of flexibility.

Figure 2:
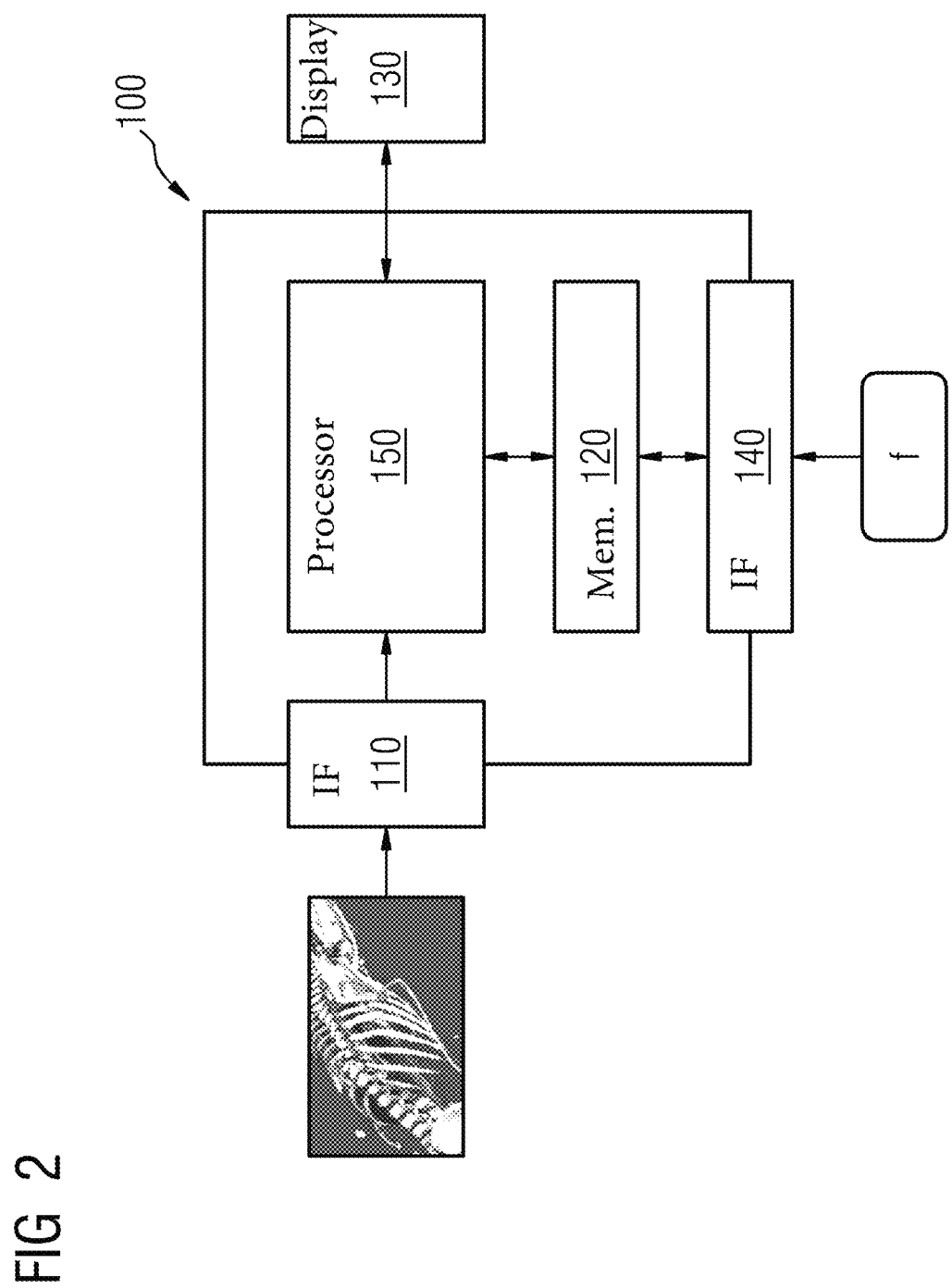
FIG. 2 is another schematic overview figure of a renderer according to another preferred embodiment.

As shown in FIG. 2, the display 130 may be transferred to another computing entity and thus may be externalized, whereas the user interface 140 remains within that computing entity, which also hosts the processing unit 150 and memory 120 for storing the signed distance field data structure. The functions as for applying the editing operations may be provided on the user interface 140.

This setting may be beneficial for educational systems, there the teacher is located at different computing entity as the pupil. For example, the teacher may be using a computing system, where the display 130 resides and the pupil may use a computing system, where the user interface 140 may reside. Another use case relates to a lecture hall setting with a high-quality renderer (serving as image generator) and a large display, coupled with tablet running the live paint/annotation user interface and preview-quality rendering.

Also distributed annotation scenarios with multiple devices running the annotation user interface against a shared renderer. The calculated visualization is the output of the interactive editing and/or rendering algorithm. This output may be provided on the display 130 or on the user interface 140. In another embodiment, the output may be provided on both, the display 130 and the user interface 140. For implementing educational system, an additional communication channel between the teacher and the pupil may be provided for transmitting instructions for editing a three-dimensional volume. This system may also be deployed as client server system.

Figure 3:
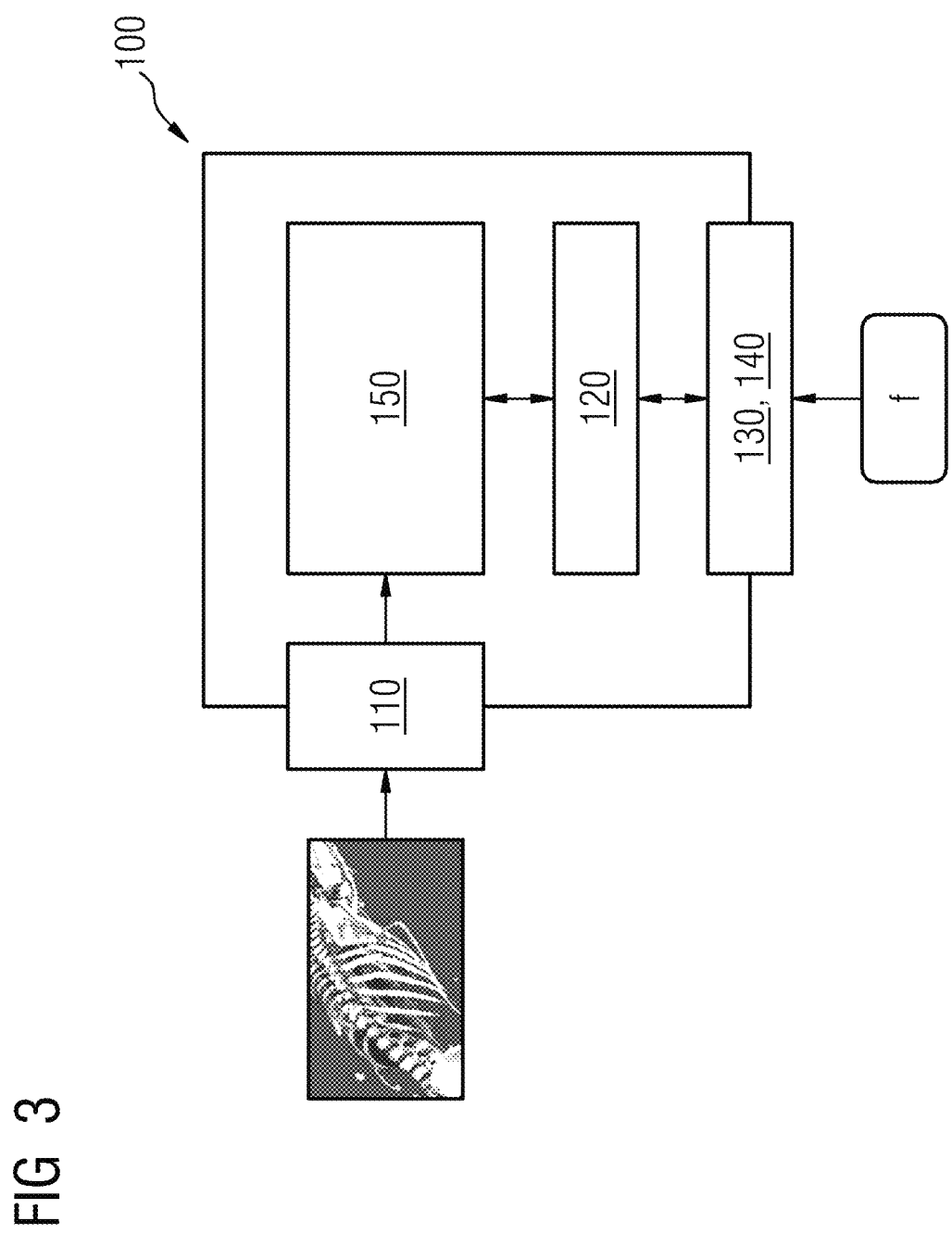
FIG. 3 is still another schematic overview figure of a renderer according to another preferred embodiment.

Another setting is described with respect to FIG. 3. In this case, the display 130 and the user interface 140 are deployed in the same unit. Thus, the display 130 is configured as a graphical user interface for input and output of data.

Figure 4:
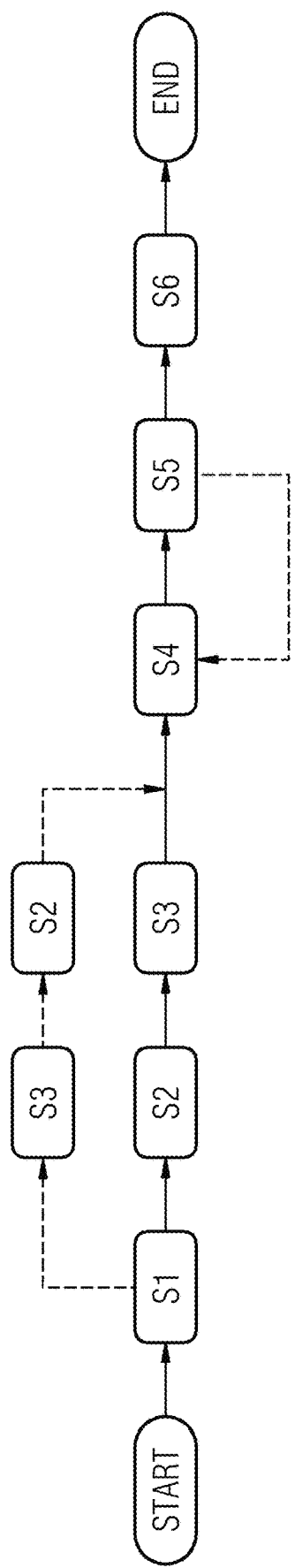
FIG. 4 is a flow chart of a method for interactive editing, displaying different embodiments.

FIG. 4 is a flow chart of an interactive editing method. After starting the method, in act S1, a dataset with volumetric image data is received. In act S2, the received volumetric image data is displayed, in particular the display 130. In act S3, a signed distance field data structure is calculated and provided, which structure is based on the received dataset. In act S4, editing operations may be performed on a user interface 140 for editing at least a part of volumetric image data. These editing operations are then transformed to operations in the provided signed distance field data structure. In act S5, a visualization of the editing operations, which have been performed, is calculated. As indicated in Fi. 4 with the dashed lines, the acts S4 and S5 may be re-iterated. In act S6, the calculated visualization is displayed as a result on the display 130.

The acts of displaying S2 and providing S3 may be changed in sequence, as depicted in FIG. 4 with the dashed lines. Thus, first the signed distance field data structure may be provided and/or calculated and subsequently the received volumetric image data may be displayed in act S2. In a preferred embodiment, the acts of performing the editing operations in act S4, the calculation S5 and the displaying of the result in act S6 are executed in parallel so as to providing a real-time interactive editing system.

As depicted in FIG. 4 the method may be used iteratively by using the output result with the calculated visualization, encoding the performed editing operations as input again for performing further or second editing operations in the calculated visualization. After this, the so generated second result may be displayed as further calculated visualization. This feature has the technical effect that modifications and corrections may be applied on the calculated visualization for the editing operations. This helps to improve quality of the displayed image data.

After act S6, the method may end.

Figure 5:
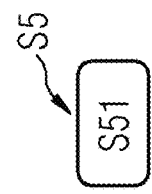
FIG. 5 represents a preferred embodiment of calculating a visualization.

FIG. 5 shows an embodiment for the act of calculating the visualization of the editing operations in act S5. Preferably, a segmentation algorithm S51 may be used for this.

Figure 6:
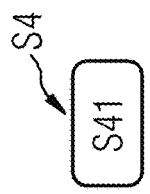
FIG. 6 represents a preferred embodiment of performing the editing operations.

FIG. 6 shows an embodiment relating to how to perform the editing operations in act S4. Preferably, a brush-based algorithm S41 may be used. In correspondence to the other functions f, implementing the editing operations, different functionalities may be configured, for example annotating, clipping, marking, as already mentioned above. For example, a thin or thick brush may be used and/or brushes in different colors.

Figure 7:
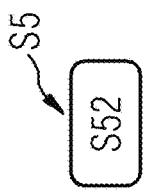
FIG. 7 represents another preferred embodiment of calculating the visualization.

FIG. 7 shows a preferred embodiment for the act of calculating the visualization of the editing operations in act S5. Preferably, a rendering algorithm, in particular a ray casting algorithm S52 may be applied.

Figure 8:
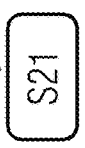
FIG. 8 represents a preferred embodiment for displaying the received volumetric image data.

FIG. 8 shows a preferred embodiment for the act of displaying the received volumetric image data in act S2. Preferably, a first rendering algorithm S21 may be applied and used for displaying the received volumetric image data.

Figure 9:
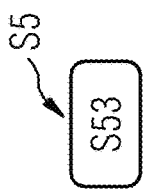
FIG. 9 represents still another preferred embodiment for calculating a visualization.

A second rendering algorithm may be used in act S53, which rendering algorithm is used for visualizing the editing operations, which is depicted in FIG. 9.

Any reference signs in the claims should not be construed as limiting the scope.

Wherever not already described explicitly, individual embodiments, or their individual aspects and features, described in relation to the drawings can be combined or exchanged with one another without limiting or widening the scope of the described invention, whenever such a combination or exchange is meaningful and in the sense of this invention. Advantages which are described with respect to a particular embodiment of present invention or with respect to a particular figure are, wherever applicable, also advantages of other embodiments of the present invention.

The invention claimed is:

1. A computer-implemented method for interactive editing of volumetric image data, the method comprising:
   receiving a dataset with volumetric image data acquired from an image acquisition modality;
   providing a signed distance field data structure of the received dataset, wherein the signed distance field data structure comprises an additional data structure with respect to the volumetric image data, wherein signed distance field data structure is registered to the received volumetric image data that serves as a primary anatomy image;
   receiving editing operations on a user interface for editing at least a part of the provided signed distance field data structure;
   rendering a visualization of the primary anatomy image by sampling visual effects provided by the editing operations;
   displaying the visualization on a display.

2. The method according to claim 1, wherein the editing operations comprise masking of the volumetric image data during the editing operations, based on values of the signed distance field data structure.

3. The method according to claim 2, wherein signed distance field data structure is sampled with reconstruction filters.

4. The method according to claim 1, wherein the editing operations are performed by using a brush-based algorithm.

5. The method according to claim 1, wherein the method is used iteratively by using the visualization, encoding the performed editing operations, as volumetric image data for performing further editing operations in the visualization, which are displayed iteratively as further visualizations.

6. The method according to claim 1, wherein a plurality of corresponding or different one of the editing operations are performed for different parts of the volume to be represented in common in the visualization.

7. The method according to claim 1, wherein rendering the visualization of the edited volumetric image data uses a segmentation algorithm, SDF-based brushes, or manually indicated edits.

8. The method according to claim 1, wherein rendering the visualization of the edited volumetric image data is executed by directly transforming and embedding user-defined editing operations in a three-dimensional space in the signed distance field data structure of the volumetric image data.

9. The method according to claim 1, wherein rendering the visualization of the edited volumetric image data is based on a rendering algorithm.

10. The method according to claim 9, wherein rendering the visualization of the edited volumetric image data is based on a raycasting algorithm as the rendering algorithm.

11. The method according to claim 1, wherein, for displaying the received volumetric image data, a first rendering algorithm is used, and/or, for rendering the visualization of the editing operations, a second rendering algorithm is used.

12. The method according to claim 11, wherein the second rendering algorithm is a level-set algorithm for calculating a smooth segmentation boundary representation from a signed distance field volume.

13. The method according to claim 1, wherein rendering the visualization of the editing operations uses a set of voxel classifiers for classifying different volume properties, the different volume properties comprising different colorization values, different opacity values, and/or different shading techniques.

14. The method according to claim 1, wherein the editing operations are encoded and visualized as a paint mask in the displayed visualization.

15. The method according to claim 14 wherein the paint mask comprises a semi-transparent paint layer, and wherein the paint mask is operable to be configured individually.

16. The method according to claim 1, wherein an Undo/Redo function is provided for the editing operations.

17. A renderer for interactive editing of volumetric image data, the renderer comprising:
   an image interface configured to receive a dataset with volumetric image data acquired from an image acquisition modality;
   a memory interface to a memory, the memory configured to store a signed distance field data structure of the received dataset, wherein the signed distance field data structure comprises an additional data structure with respect to the volumetric image data, wherein signed distance field data structure is registered to the received volumetric image data that serves as a primary anatomy image;
   a display interface to a display for displaying the received volumetric image data;
   a user interface configured for performing editing operations for editing at least a part of the signed distance field data structure; and
   a processor configured to render a visualization of the primary anatomy image by sampling visual effects provided by the editing operations of the at least part of the provided signed distance field data structure and to instruct the display to display the visualization.

18. A non-transitory computer-readable medium on which instructions are stored that can be read and executed by a computer for interactive editing of volumetric image data, the instructions comprising:
   receiving a dataset with volumetric image data acquired from an image acquisition modality;
   providing a signed distance field data structure of the received dataset, wherein the signed distance field data structure comprises an additional data structure with respect to the volumetric image data, wherein signed distance field data structure is registered to the received volumetric image data that serves as a primary anatomy image;
   receiving editing operations on a user interface for editing at least a part of the provided signed distance field data structure;
   rendering a visualization of the primary anatomy image by sampling visual effects provided by the editing operations; and
   displaying the visualization on a display.

* * * * *